United States Patent [19]
Gelfand et al.

[11] 3,869,510
[45] Mar. 4, 1975

[54] PREPARATION OF 3,5-DICHLOROBENZOYL CHLORIDE

[75] Inventors: Samuel Gelfand, Niagara Falls; John C. Graham, Grand Island, both of N.Y.

[73] Assignee: Hooker Chemicals & Plastics Corp., Niagara Falls, N.Y.

[22] Filed: May 25, 1973

[21] Appl. No.: 364,200

[52] U.S. Cl. .......................................... 260/544 M
[51] Int. Cl. ...................... C07c 51/58, C07c 63/10
[58] Field of Search .................... 260/544 D, 544 A

[56] References Cited
FOREIGN PATENTS OR APPLICATIONS
957,957   5/1964   Great Britain OTHER PUBLICATIONS
Tsuji et al., Tetrahedron Letters, No. 50, pp. 4565–4568, (1965).
Tsuji et al., J.A.C.S. 90:1, (1968) pp. 94–107.
Blum et al., J.A.C.S. 89:10, May 10, 1967, pp. 2338–2341.
Tsuji et al., Synthesis, No. 4, 1969, pp. 157–169.

*Primary Examiner*—Lorraine A. Weinberger
*Assistant Examiner*—Richard D. Kelly
*Attorney, Agent, or Firm*—Peter F. Casella; Donald C. Studley; William J. Crosetta, Jr.

[57] ABSTRACT

An improved process is disclosed for the preparation of 3,5-dichlorobenzoyl chloride which comprises decarbonylating 5-chloroisophthaloyl chloride in the presence of a catalytic amount of a compound selected from the group consisting of palladium chloride, palladium/barium sulfate, palladium/aluminum oxide and mixtures thereof, at a temperature of not less than about 245 degrees centigrade.

8 Claims, No Drawings

PREPARATION OF 3,5-DICHLOROBENZOYL CHLORIDE

BACKGROUND OF THE INVENTION

There has been a rapidly increasing demand for 3,5-dichlorobenzoyl chloride for use as an intermediate in the preparation of biologically active compounds. 3,5-dichlorobenzoyl chloride has been shown to be especially suitable as an intermediate to be reacted with sulfonamides in the formation of herbicides, such as those in U.S. Pat. No. 3,534,098, having qualities which are more compatible with man's increased awareness of environmental and ecological stabilization. The select nature of these herbicides affords advantages to the economical growth of feed crops so that commercial output has been projected as increasing in the coming years. Accordingly, improvements to the process of preparing 3,5-dichlorobenzoyl chloride in higher yields and with more conveniently available commercial raw material has taken on greater importance.

Heretofore, 3,5-dichlorobenzoyl chloride has been prepared by reacting benzoyl chlorides with a sulfochlorinating agent to form a 3,5-disulfonyl benzoyl chloride product and then desulfonylating said product to form the 3,5-dichlorobenzoyl chloride. The low yields obtained thereby (about 60 percent or less) together with the pollution problems occasioned by the disposal by-product of sulfur dioxide and spent sulfuric acid have rendered this method commercially and ecologically undesirable.

It is an object of this invention to provide an improved process for the preparation of 3,5-dichlorobenzoyl chloride. It is also an object of this invention to provide an improved process for the production of 3,5-dichlorobenzoyl chloride in high yields. Another object of the present invention is to provide an improved process for the preparation of easily separable 3,5-dichlorobenzoyl chloride. Another object is to provide an improved process for the preparation of 3,5-dichlorobenzoyl chloride at a lower commercial cost. A further object is to provide a process having less pollution problems.

The process of the present invention is carried out by decarbonylating 5-chloroisophthaloyl chloride, at a temperature of not less than about 245 degrees centigrade, in the presence of a catalytic amount of a compound selected from the group consisting of palladium chloride, palladium on barium sulfate, palladium on aluminum oxide and mixtures thereof. The specificity of the catalysts together with the high operating temperature of the process provides unusual results in high yields.

DETAILED DESCRIPTION OF THE INVENTION

More particularly, the process of the present invention comprises decarbonylating, in the liquid phase, 5-chloroisophthaloyl chloride at a temperature of from about 245 degrees centigrade to about 320 degrees centigrade with a catalyst selected from the group consisting of palladium chloride, palladium on barium sulfate, palladium on aluminum oxide and mixtures thereof. Only a small amount of catalyst need be present to effect the decarbonylation process to provide high yields. As little as 0.01 percent by weight of the catalyst may bring about an increase in yield of 3,5-dichlorobenzoyl chloride. There appears to be no advantage in using more than about 3.0 percent by weight of the catalyst, the preferred range being from about 0.025 percent to about 1.5 percent by weight of catalyst.

It has unexpectedly been found that the specified catalysts display an unusual degree of activity when the decarbonylating process is run at temperatures above about 245 degrees centigrade. At about the said temperature yields dramatically increase, together with an increase in the purity of the product.

The 5-chloroisophthaloyl chloride starting material may be prepared by several methods, one being the chlorination of isophthaloyl chloride in the presence of a catalyst. Chlorination may be accomplished at temperatures from above about 150 degrees centigrade using catalysts such as $MoCl_5$ and $FeCl_3$.

The decarbonylation reaction may be carried out at higher temperatures from about 280 degrees centigrade to about 300 degrees centigrade and at atmospheric pressure by utilizing a flux oil medium wherein the flux oil has a boiling point in excess of 300 degrees centigrade. It has been found that such high temperature decarbonylation produces a purer 3,5-dichlorobenzoyl product. A preferred temperature is from about 270 degrees centigrade to about 280 degrees centigrade.

Details of preparing the starting material and the final product are given in the following examples which are presented for purposes of illustration and are not intended to limit the scope of the invention.

EXAMPLE I

To 100 grams of isophthaloyl chloride was added 0.5 percent by weight $MoCl_5$ and the mixture was charged to a reaction vessel. Chlorine gas, in an amount in excess of a 1:1 mole ratio, but less than 4:1 mole ratio, with the isophthaloyl chloride was added to the reaction vessel and the mixture was maintained at about 227 degrees centigrade for about 6 hours. The reaction product was distilled and found to contain 32 percent isophthaloyl chloride, 65 percent 5-chloroisophthaloyl chloride, the remainder being a mixture of terephthaloyl chloride and unidentified high boilers.

EXAMPLES II – IV

Using the procedure of Example I, varying amounts of $FeCl_3$ together with varying temperatures and reaction times gave the following results:

TABLE I

| % By Weight Amount of Catalyst | Temp. (°C.) | Reaction Time (Hours) | Isophthaloyl Chloride Product (%) | 5-Chloro-isophthaloyl Chloride Product (%) | Residue and Impurities |
| --- | --- | --- | --- | --- | --- |
| 0.5 | 225 | 8 | 24 | 73 | 3 |
| 1.0 | 230 | 6–7 | 23 | 73 | 4 |
| 0.5 | 190–200 | 9 | 13.5 | 75 | 11.5 |

EXAMPLE V 4.0 grams of 5-chloroisophthaloyl chloride was heated to a temperature of about 250 - 260 degrees centigrade for about 4 hours in the presence of 0.02 grams of 5 percent Pd/BaSO$_4$. The product thereof was distilled yielding 3.0 grams of a mixture comprising 74 percent by weight 5-chloroisophthaloyl chloride, 25 percent by weight 3,5-dichlorobenzoyl chloride and 0.9 percent by weight 1,3,5-trichlorobenzene.

EXAMPLE VI

Following the procedure of Example V, utilizing 0.1 grams of catalyst, 20 grams of 5-chloroisophthaloyl chloride was heated for 8 hours. Upon distillation, 17.3 grams of a mixture comprising 38.1 percent by weight 5-chloroisophthaloyl chloride, 57.2 percent by weight 3,5-dichlorobenzoyl chloride and 4.7 percent by weight 1,3,5-trichlorobenzene was obtained.

EXAMPLE VII 20.0 grams of 5-chloroisophthaloyl chloride was subjected to the procedure of Example V in the presence of 0.1 grams of 5 percent Pd/Al$_2$O$_3$. The distillation product yielded 18.6 grams of a mixture containing 67.3 percent 5-chloroisophthaloyl chloride, 27.1 percent 3,5-dichlorobenzoyl chloride and 5.6 percent 1,3,5-trichlorobenzene.

EXAMPLE VIII

Example VII was rerun using PdCl$_2$. The final product contained 88.5 percent 5-chloroisophthaloyl chloride, 9.9 percent 3,5-dichlorobenzoyl chloride and 1.7 percent 1,3,5-trichlorobenzene.

EXAMPLE IX

Apparatus was assembled comprising a heating vessel and a 12 inch heated column packed with steel helices. The vessel was charged with 20 grams of 5-chloroisophthaloyl chloride and 0.02 grams of 1 percent Pd/Al$_2$O$_3$ and was heated to boiling (276 degrees centigrade) and refluxed for 8 hours. The product was then distilled for 16 hours at a constant head temperature of 264 degrees centigrade and 3,5-dichlorobenzoyl chloride was continuously removed in admixture with 1,3,5-trichlorobenzene. 100 percent of the 5-chloroisophthaloyl chloride had reacted yielding a product containing 56 percent 3,5-dichlorobenzoyl chloride and 44 percent 1,3,5-trichlorobenzene.

EXAMPLE X

The procedure of Example IX was repeated wherein reflux was limited to 4 hours at a temperature of 272 degrees centigrade. After 17 hours of distillation at a constant head temperature of 272 degrees centigrade, 100 percent of the 5-chloroisophthaloyl chloride had reacted yielding a product containing 88 percent 3,5-dichlorobenzoyl chloride and 12 percent 1,3,5-trichlorobenzene.

We claim:

1. A process for the preparation of 3,5-dichlorobenzoyl chloride which comprises decarbonylating, in the liquid phase, 5-chloroisophthaloyl chloride in the presence of a catalytic amount of a compound selected from the group consisting of palladium chloride, palladium/barium sulfate, palladium/aluminum oxide and mixtures thereof, at a temperature of not less than about 245 degrees centigrade.

2. The process of claim 1 wherein said decarbonylation is in the presence of between about 0.01 and 3.0 percent by weight catalyst.

3. The process of claim 1 wherein said decarbonylation is in the presence of between about 0.025 and 1.5 percent by weight catalyst.

4. The process of claim 1 wherein the temperature is from about 245 degrees centigrade to about 320 degrees centigrade.

5. The process of claim 1 wherein the temperature is from about 270 degrees centigrade to about 280 degrees centigrade.

6. The process of claim 1 wherein the temperature is about 276 degrees centigrade.

7. A process for the liquid phase preparation of 3,5-dichlorobenzoyl chloride which comprises heating 5-chloroisophthaloyl chloride to its boiling point, refluxing said 5-chloroisophthaloyl chloride at a temperature of not less than about 245 degrees centigrade, thereafter, distilling the reflux product and removing the product thereof, all in the presence of a catalyst selected from the group consisting of palladium chloride, palladium/barium sulfate, palladium/aluminum oxide and mixtures thereof.

8. The process of claim 7 wherein the 3,5-dichlorobenzoyl product is continuously removed during distillation.

* * * * *